United States Patent [19]

Hickey et al.

[11] 4,177,144
[45] Dec. 4, 1979

[54] EXCESS-GROWTH CONTROL SYSTEM FOR FLUIDIZED-BED REACTOR

[75] Inventors: Robert F. Hickey, Florence, Mass.; Roger W. Owens, Deer Park, N.Y.

[73] Assignee: Ecolotrol, Inc., Bethpage, N.Y.

[21] Appl. No.: 926,207

[22] Filed: Jul. 19, 1978

[51] Int. Cl.$^2$ ............................................. B01D 15/02
[52] U.S. Cl. ..................................... 210/86; 210/106; 210/263; 210/DIG. 22
[58] Field of Search .................... 210/3, 8, 80, 86, 91, 210/104, 106, 268, 108, 263, DIG. 22; 55/77, 390

[56] References Cited

U.S. PATENT DOCUMENTS

| | | | |
|---|---|---|---|
| 3,846,289 | 5/1974 | Jeris et al. | 210/8 |
| 4,009,098 | 2/1977 | Jeris | 210/3 |
| 4,009,099 | 2/1977 | Jeris | 210/3 |
| 4,032,407 | 6/1977 | Scott et al. | 195/127 |
| 4,133,759 | 1/1979 | Ikeda et al. | 210/104 |

*Primary Examiner*—John Adee
*Attorney, Agent, or Firm*—Michael Ebert

[57] ABSTRACT

A control system to prevent the accumulation of excessive cellular material in a fluidized-bed reactor wherein waste water or other liquid to be processed is conducted upwardly at a velocity conducive to fluidization through a bed of particles which function as a carrier for the growth of the material. Included in the system is a separator column whose low end extends toward the fluidized bed and whose high end extends toward a head of liquid effluent which lies on the bed. In the course of reactor operation, the cellular material on the particles continues to grow, causing the bed to expand until its level reaches an alarm point indicative of excessive growth. This point is sensed to activate an agitator arrangement which effects shearing of the excess cellular material from the particles to produce in the separator column a mixture of sheared material and partially stripped carrier particles. The separator column is provided with a draw-off port somewhat below the surface of the effluent head, the exit flow rate at the draw-off port being adjusted so that the resultant upward flow velocity in the separator column is lower than the settling velocity of the carrier particles in the mixture but higher than that of the sheared material. As a consequence, the sheared material is washed away through the draw-off port, whereas the partially stripped carrier particles fall back into the fluidized bed. This activity continues until the level of the bed falls to a predetermined safety point below the alarm point when the activity is discontinued to complete the cycle which is not repeated until the bed again expands to reach the alarm point.

20 Claims, 10 Drawing Figures

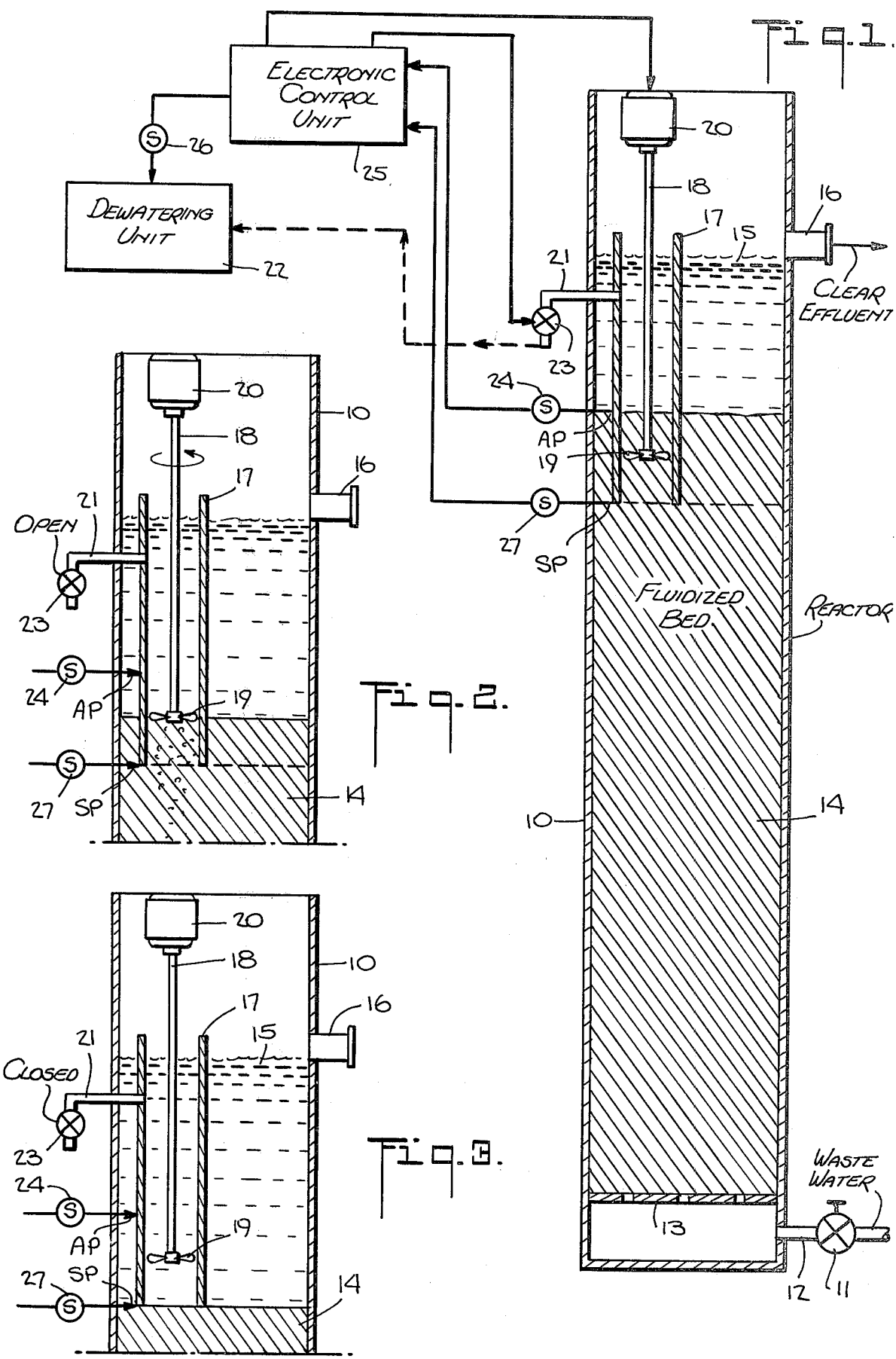

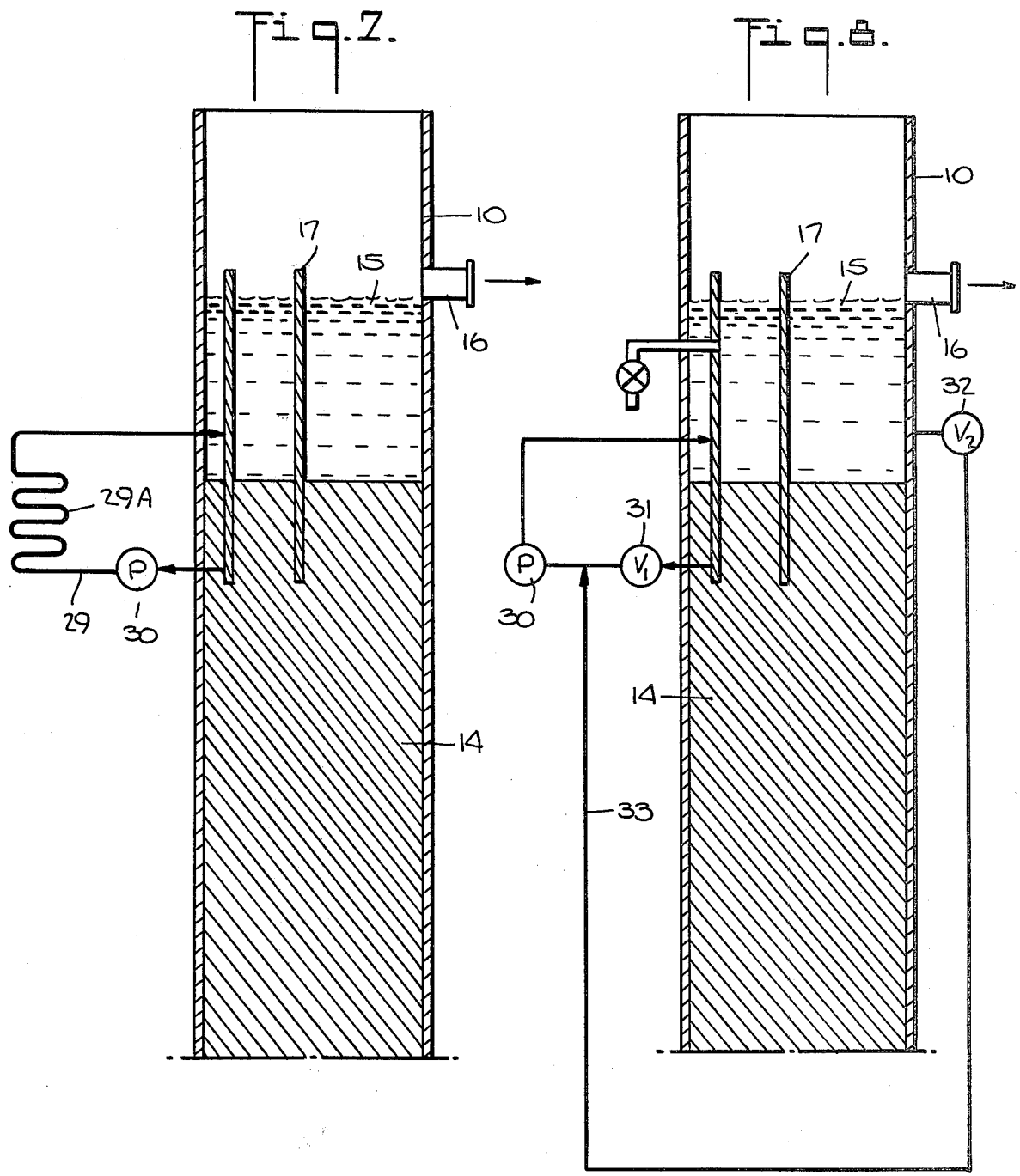

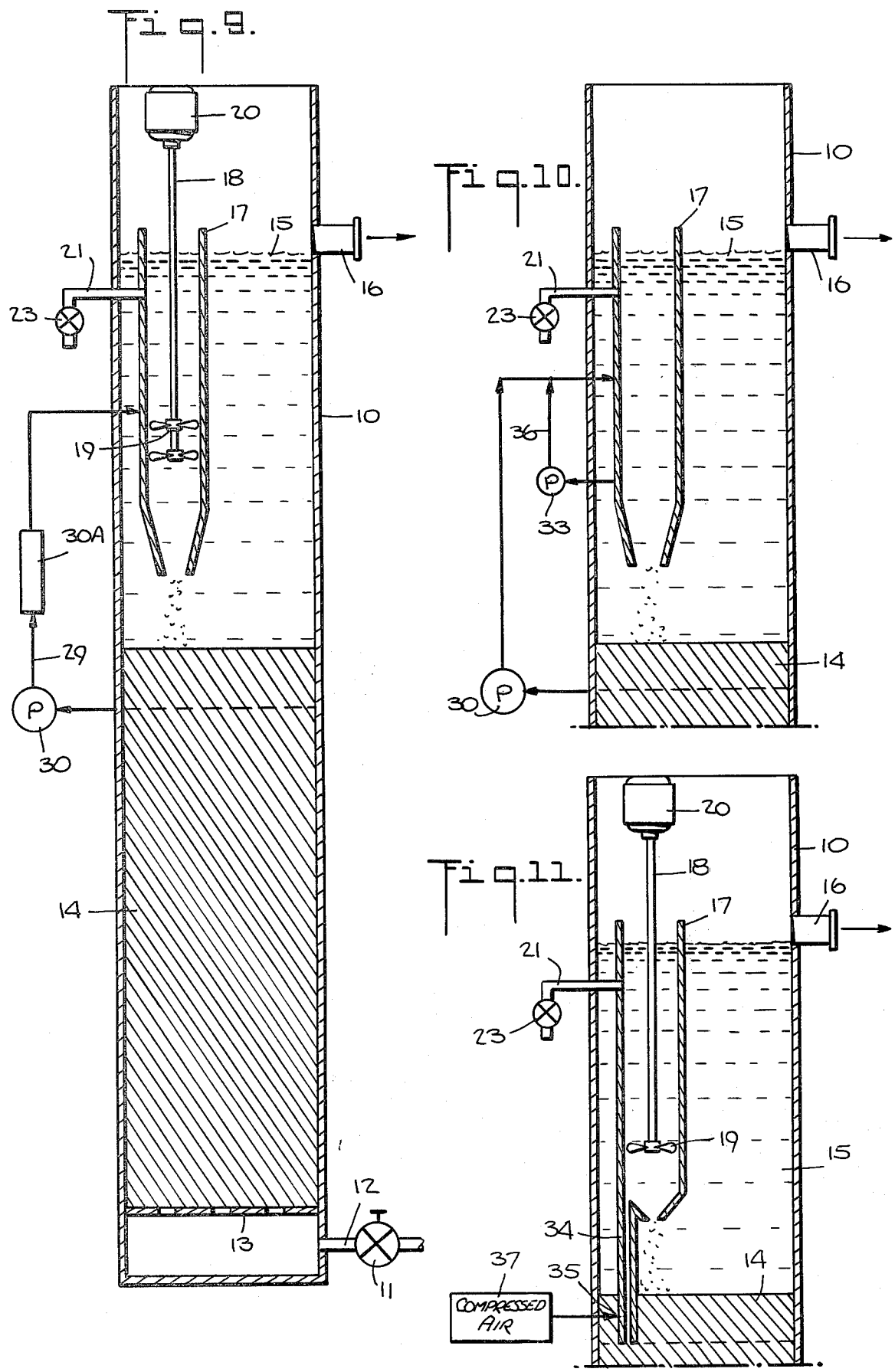

EXCESS-GROWTH CONTROL SYSTEM FOR FLUIDIZED-BED REACTOR

BACKGROUND OF INVENTION

This invention relates generally to a fluidized-bed reactor in which waste water or other liquid to be processed is conducted upwardly through a bed of small carrier particles which in the course of operation are enlarged by the growth of cellular material thereon, and more particularly to a system for controlling the accumulation of such material in a fluidized-bed reactor to prevent excessive growth thereof.

The invention will be described in connection with reactors for extracting nitrogen compounds such as nitrate or ammonia from waste water by means of a fluidized bed of solid particles serving as carriers for micro-organisms grown thereon. These reactors are preferably of the type disclosed in the Jeris et al. U.S. Pat. Nos. 3,846,289 and in the Jeris patent 4,009,099, whose entire disclosures are incorporated herein by reference.

It is to be understood, however, that a system in accordance with the invention is also applicable to other forms of fluidized-bed reactors in which the need exists to control the build-up of bacteria and other types of cellular material on the carrier particles to prevent excessive growth thereof. Thus the invention is useful in connection with the fluidized-bed reactors of the type disclosed in U.S. Pat. Nos. 4,032,407 and in the Jeris patents 4,009,098 and 4,009,105.

It is now recognized that the existence of nitrogen compounds in waste water represents a serious threat to ecological balances existing in nature. Accelerated eutrophication of lakes and streams is often caused by feeding conventionally-treated waste effluent into surface waters. While such treatment is designed to remove solids and oxygen-demanding organic material, they do not extract from these wastes the substantial quantities of ammonia and nitrate ions which are contained therein and which promote the production of algae.

Aside from being a major nutrient to algae growth, nitrogen in the form of ammonia is toxic to aquatic life and can react with a chlorine disinfectant to form chloramines which are carcinogenic. Hence there is a need for waste water treatment that effects almost complete denitrification; that is, the conversion of nitrate or nitrite compounds to non-polluting elemental nitrogen gas prior to the release of the wastes to surface waters.

The fluidized-bed reactors disclosed in the above-identified Jeris et al. and Jeris patents accomplish denitrification by a biological process in which bacteria act to reduce nitrite or nitrate constituents in the influent waste stream into harmless nitrogen gas. This process is carried out in a fluidized-bed reactor in which the waste water to be treated passes upwardly through a bed of small particles, such as activated carbon or sand, at a velocity sufficient to cause motion or fluidization of all of the medium which then functions as a carrier or support surface for the growth of bacteria.

The use of small sand or other particles provides a vast surface area on which the bacteria can flourish and grow, thereby making it possible to remove a considerable amount of contaminants from the waste water in a relatively small reactor volume. Fluidization of the medium augments the effective surface area, compared to that of packed beds, and it minimizes operational problems such as the clogging and head loss encountered in packed beds.

As waste water containing nitrogen in the form of ammonia or nitrate is passed through a fluidized bed, bacterial growth is accelerated and the size of the particles undergoes enlargement. If this growth is unchecked, the bed particles become enlarged to a degree resulting in agglomeration, thereby reducing the biological surface area per unit volume of the reactor and the efficiency of the reactor column. Moreover, as the particles swell, they are reduced in specific gravity and thereby acquire a tendency to float and to be carried away from the bed. Also, when the particles are excessively enlarged, they are prone to entrap or become attached to gas bubbles. This further reduces the specific gravity of the particles and the tendency of the particles to be carried away from the bed.

The primary concern of the present invention is with the removal of excess cellular material or bacterial growth on the particles of a fluidized-bed reactor in the course of operation, thereby obviating the tendency of the particles to be carried away in the process effluent. The term "excess cellular material" as used herein refers to the amount of material attached to the particulate carrier beyond that needed for the normal operating of the reactor. In a fluidized-bed reactor for denitrification, sufficient growth in the form of a thin layer of bacteria must be retained on the particles in order to maintain the efficiency of the process. Hence a system which so abrades or shears the particles as to remove all bacterial growth is destructive of the process.

Another concern of the invention is with the control of the thickness of the bio-mass layer on the carrier particles so that an optimum film thickness can be maintained in the biological reactor.

Various techniques have heretofore been proposed to prevent the accumulation of excess cellular material on the carrier particles in a fluidized-bed reactor. One such technique is disclosed in the Jeris U.S. Pat. No. 4,009,099 wherein the bacterial growth on the particles is monitored as a function of bed expansion. This is accomplished by an optical device or other form of solids sensor, such that when bed expansion reaches a given height to activate the sensor, the bed particles are regenerated by abrasion to remove excessive cellular material.

This is effected mechanically by a stirrer at the top of the column in the form of sharp rotating blades or other means. The partially stripped carrier particles acted upon by the stirrer settle back into the fluidized bed, whereas the sheared-off excess cellular material which has greater buoyancy than the carrier particles is carried away in the effluent process stream.

Since in this prior Jeris arrangement, the output of the reactor includes the excess cellular material, it is necessary to use a clarifier or other solids-separation means to remove the sheared solids from the process effluent.

Another approach heretofore taken to control the production of sludge is to premit the growth-covered particles to flow out with the process effluent into a settling tank which separates these particles from the process effluent. The excess growth is then mechanically sheared from the carrier particles, and the mixture of sheared sludge and particles is returned to the fluidized bed. In this technique, a clarifier or other solids separation unit must be used in conjunction with the settling tank to remove the sheared sludge from the process effluent. Alternatively, the sheared growth can be separated from the carrier particles in the return path between the settling tank and the fluidized bed, thereby eliminating the need for a clarifier in the output of the reactor, but requiring instead a separator unit in the return path.

Still another effective approach in current use for removing excess sludge is by means of a vibrating screen. In this technique, the growth-covered particles are pumped from the fluidized bed to the vibrating screen, the pumping action serving to agitate the particles and to shear excess growth therefrom and the vibrating screen functioning to separate the sheared growth from the carrier particles. These particles are then returned to the fluidized bed, whereas the sheared growth is wasted. Alternatively, shearing may be effected by means other than a pump.

The use of a vibrating screen in a growth control system has one important advantage, for it obviates the need for a clarifier in the output of the reactor. On the other hand, a vibrating screen is subject to plugging, and this dictates the use of a washing spray to keep the screen free. This is a serious drawback; for the spray dilutes the concentration of the waste sludge which must be further processed.

Moreover, during the operation of a vibrating screen, some sheared solids remain loosely attached to the carrier particles, and when the carrier particles are returned to the fluidized bed, these solids are brought along and escape into the process effluent, thereby degrading the quality of the effluent when the screen is operative. Furthermore, a vibrating screen, which is a fairly expensive and sophisticated unit, has inherent practical limitations with respect to the amount of liquid it can handle.

In calculating the overall cost of installing and operating an excess growth control system, one must not only take into account the amount of energy that is necessary to shear excess growth from the carrier particles but also the fact that this shearing action directly affects the dewaterability of the resultant sludge. In order to dispose of this sludge, it must first be dewatered. If, for example, the abrading technique for shearing the growth tends to dissect the sludge into fine pieces which are then suspended in the water and are slow to settle, dewaterability becomes more difficult.

The nature of the pollutant being removed from the liquid and the type of fluidized-bed process employed for this purpose determines the type of biological organisms which predominate in the treatment system therefor. For a given system, there is an optimum amount of energy which must be imparted to the excess growth shearing means to attain the most dewaterable sludge.

Inasmuch as the handling and disposal of the sludge in a biological treatment facility can represent a substantial percentage of the overall cost of treatment, running as high as 40%, the dewaterability of the excess sludge production directly affects this cost and cannot, therefore, be disregarded; for the more easily dewaterable the sludge, the less expensive is the sludge-handling procedure.

Thus while various techniques and systems based thereon have heretofore been provided to control excess growth in a fluidized-bed reactor, all of these known techniques have entailed clarifiers and other expedients which add substantially to the cost of installing and operating the control systems in a manner yielding an effluent free of sheared material.

SUMMARY OF INVENTION

In view of the foregoing, the primary object of this invention is to provide a highly-efficient system for controlling the growth of cellular material on the carrier particles of a fluidized-bed reactor, which system is operationally simple and relatively inexpensive.

More particularly, it is an object of this invention to provide a control system of the above-type in which the energy required to shear growth from the carrier particles can be governed to produce a sludge having optimum dewaterability characteristics.

Also an object of the invention is to provide a control system which includes a separator column that is disposed within a fluidized bed reactor and which exploits the difference in the settling velocities of partially stripped carrier particles and the excess growth sheared therefrom.

Briefly stated, these objects are attained in a control system for preventing the accumulation of excessive cellular material in a fluidized-bed reactor wherein waste water or other liquid to be processed is passed upwardly at a velocity conducive to fluidization through a bed of particles which function as a carrier for the growth of the material. A head of effluent is developed above the bed, the effluent being discharged from the reactor through a clear-effluent port.

Included in the system is a separator column whose low end extends toward the fluidized bed and whose high end extends toward the effluent head. In the course of reactor operation, the cellular material on the particles continues to build up, causing the bed to expand until its level reaches an alarm point indicative of excessive growth. This alarm point is sensed to activate an agitator arrangement which effects shearing of the excess growth from the carrier particles to generate in the separation column a mixture of sheared material and partially-stripped carrier particles.

The separator column is provided with a draw-off port somewhat below the surface of the effluent head. The exit flow rate of the draw-off port is adjusted so that the upward flow velocity in the separator column is lower than the settling velocity of the carrier particles in the mixture, but higher than that of the sheared material. As a consequence, the sheared material is washed away through the draw-off port, whereas the partially-stripped carrier particles fall back into the fluidized bed. This excess growth removal continues until the level of the bed falls to a predetermined safety point below the alarm point when the activity is discontinued to complete the cycle which is not repeated until the bed again expands to reach the alarm point.

Because the sheared growth is confined to the separator column, none of this material can enter the process effluent stream; hence no need exists for a clarifier in the output line of the fluidized-bed reactor as in prior control systems to provide a clear effluent. In one embodiment, the concentration of the waste sludge emitted from the draw-off port can advantageously be controlled simply by adjusting the exit flow rate from the port. And the amount of energy imparted to the growth shearing activity can be controlled so that optimum sludge dewaterwability is obtainable for a given set of operating conditions.

OUTLINE OF DRAWINGS

For a better understanding of the invention as well as other objects and further features thereof, reference is made to the following detailed description to be read in conjunction with the accompanying drawings, wherein:

FIG. 1 schematically illustrates a known form of fluidized bed reactor operating in conjunction with one preferred embodiment of an excess-growth control system in accordance with the invention, the system being shown at the point where its operating cycle is initiated;

FIG. 2 shows the same control system at an intermediate point in the cycle;

FIG. 3 shows the same control system at the completion of its operating cycle;

FIG. 7 illustrates a fifth embodiment of the invention;

FIG. 8 illustrates a feature of the invention to be used in combination with the third, fourth and fifth embodiments;

FIG. 9 illustrates a sixth embodiment of the invention in which the entire separator column is located in the head or clear zone above the fluidized bed;

FIG. 10 illustrates a seventh embodiment of the invention; and

FIG. 11 illustrates an eighth embodiment of the invention.

DESCRIPTION OF INVENTION

First Embodiment

Figure 4:
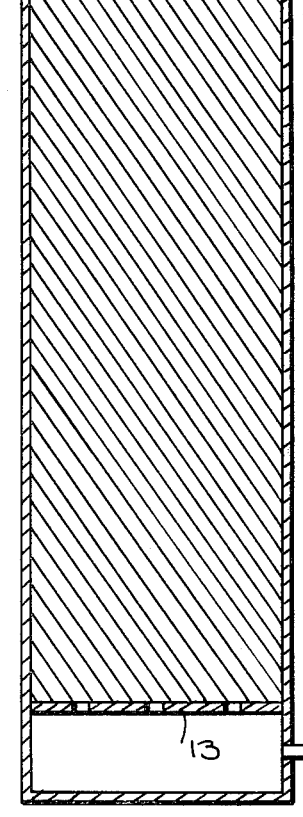
FIG. 4 shows a second embodiment of a control system in accordance with the invention.

Since an excess-growth control system in accordance with the invention is usable with any known form of fluidized-bed reactor such as the reactor disclosed in the Jeris U.S. Pat. No. 4,009,099, the reactor structure and its operation will only be briefly outlined.

As shown in FIG. 1, waste water or other liquid to be processed is introduced into the cylindrical column 10 of the reactor through a valve 11 and inlet pipe 12 feeding the liquid into the lower portion of the column through a manifold 13. Mirco-organisms or biota-seeded bed particles of sand or other particular material are fluidized by the passage of the waste water at an appropriate velocity through the reactor column to create a fluidized bed 14.

Developed above the fluidized bed 14 is an effluent head 15 whose level is fixed by a clear-effluent discharge port 16 adjacent the upper end of the reactor. In the course of reactor operation, the cellular material on the particles continues to grow, causing fluidized bed 14 to expand upwardly, this expansion being accompanied by the concurrent contraction of the effluent head 15.

Associated with the fluidized bed reactor is a control system to prevent the accumulation of excessive cellular material, the control system including a relatively small, open-ended separator column 17 immersed in effluent head 15, the low end of the separator column extending into the fluidized bed and the high end thereof extending above the effluent head.

At a point somewhat below the surface of effluent head 15, separator column 17 is provided with a draw-off port 21 which feeds sheared material washed out of the column into a dewatering unit 22 through a valve 23. This valve is closed when the control system is inactive. Supported on an axle 18 within the lower portion of the separator column is a mixing blade 19 driven by an external motor 20.

As the fluidized bed 14 expands upwardly, its level reaches an alarm point AP indicative of excess cellular material, which condition is detected by a level or solids sensor 24. This sensor may be in electro-optical or any other suitable form adapted to produce a signal when alarm point AP is reached.

The signal from sensor 24 serves to simultaneously activate mixing motor 20 and to open valve 23 by means of an electronic control unit 25 responsive thereto. In lieu of such automatic control, sensor 24 may be used simply to actuate an alarm pilot light to advise an operator to manually switch on motor 20 and to open valve 23. Or if in a given installation the rate of growth is fairly uniform, the mixing motor 20 and valve 23 of the system may be operated automatically by a timer mechanism.

Mixing blade 19 functions as an agitator or stirrer to shear the coated particles within the lower end portion of the separator column 17 and to generate in the separator column a mixture of sheared material and partially-stripped carrier particles. The extent of shearing is determined by the rotary speed of mixing blade 19, this rate being adjustable to afford the optimum degree of shear for the growth.

As the speed of the mixing motor is advanced, this produces increased agitation and turbulence within the separator column, resulting not only in an enhanced shearing force but also in greater pulverization of the sheared cellular material. Since excessive pulverization of the sheared material adversely affects the dewaterability of this material in dewatering unit 22, an electro-optical particle size sensor 26 may be installed in dewatering unit 22 to provide a signal indicative of the dewaterability index of the pulverized cellular material fed therein.

This index signal is applied to electronic control unit 25 to adjust the speed of motor 20 to an extent maintaining a desired degree of dewaterability. For this purpose, electronic control unit 25 may include a microprocessor programmed to analyze the index signal from sensor 26 and to provide an output signal for effecting the appropriate control of the mixing motor speed.

The upward flow velocity through separator column 17 is determined by the exit flow rate from draw-off port 22 as set by adjustment of valve 23. This exit flow rate is set so that the upward flow velocity in the separator column is higher than the downward settling velocity of the sheared growth, but lower than the downward settling velocity of the partially stripped carrier particles. As a consequence, the sheared cellular material is forced upwardly in the separator column and washed away through draw-off port 21 into the dewatering unit 22, whereas the carrier particles in the mixture fall back into the fluidized bed. In this action, the specific gravity of the coated particles is increased when most of the relatively-light cellular growth attached thereto is sheared off. In addition, by adjusting valve 23, the concentration of the waste sludge can be controlled.

As this activity continues, the size of the particles in the fluidized bed is diminished and the level of the bed, as shown in FIG. 2, gradually drops until a safety point SP is reached, this condition being sensed by a suitable level sensor 27. Sensor 27 generates a signal indicative of this condition which is applied to electronic control unit 25 to deactivate mixer motor 20 and to turn off valve 23, as shown in FIG. 3, thereby completing the excess-growth removal cycle. This cycle is not repeated until the level of the fluidized bed 14 again rises as a result of cellular growth, to reach alarm point AP.

Other Embodiments

In the embodiment shown in FIG. 4, the agitation arrangement associated with separator column 17 disposed in reactor 10 takes the form of sonic, ultrasonic or infrasonic transducer 28 adapted to impart the necessary shearing force to the coated particles, rather than a mixing blade as in the first embodiment. The transducer for this purpose may be of the type in commercial use for degreasing metal surfaces. However, in the present case, the sonic energy must be such as not to carry out complete removal of the cellular material from the particles but to effect only partial stripping thereof in order not to impair the biological process.

Enhanced results may be obtained by extending the low end of separator column 17 more deeply into fluidized bed 14 or by attaching a conical funnel 17A to the low end of the column to provide extra washing of the sheared growth away from the partially-stripped carrier particles.

Figure 5:
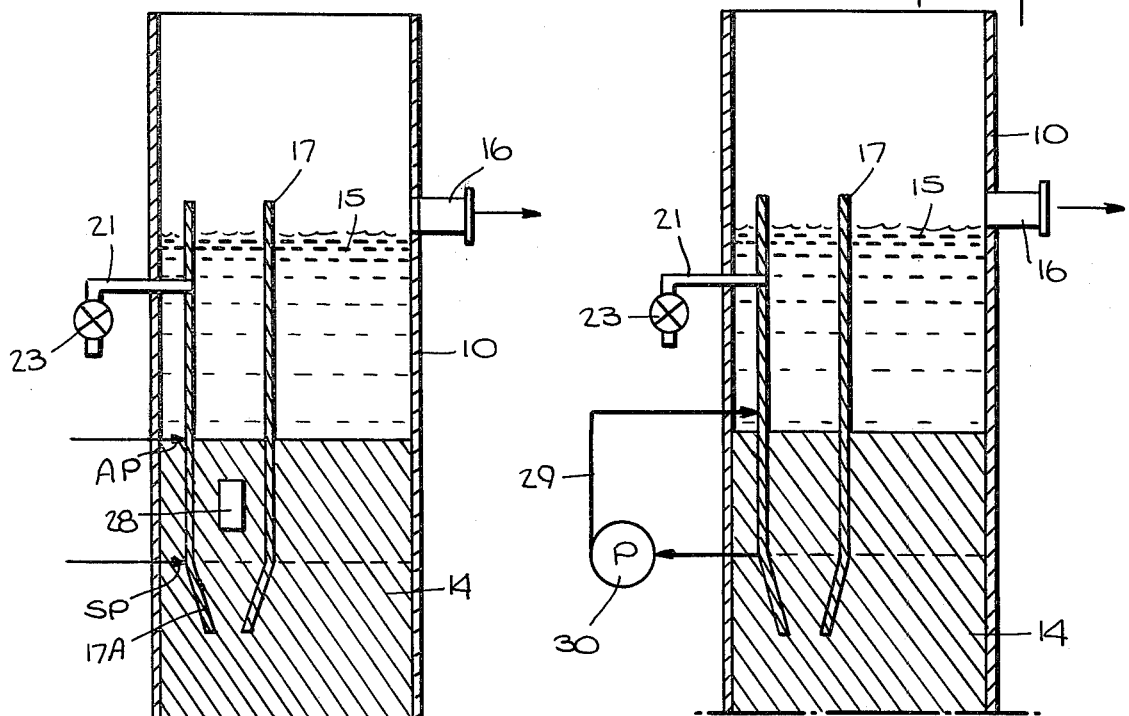
FIG. 5 illustrates a third embodiment of the control system.

Alternately, as shown in FIG. 5, the shearing of the cellular growth need not take place within separator column 17 but external to the reactor by means of a loop 29 which includes a pump 30 to draw the coated particles from the column at a point adjacent its low end and to return the particles to the column at a higher point, the pump action providing the necessary agitation or stirring of the particles to effect shearing thereof.

Figure 6:
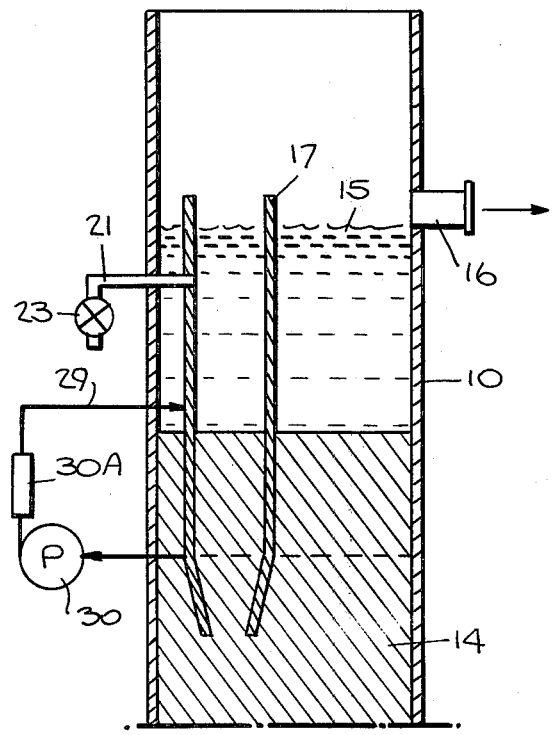
FIG. 6 illustrates a fourth embodiment of the invention.

The embodiment shown in FIG. 6 is the same as that in FIG. 5, except that loop 29 associated with separator column 17 further includes a line static mixer 30A to augment the shearing action produced by the pump.

The fifth embodiment shown in FIG. 7 is essentially the same as that shown in FIG. 5, except that loop 29 associated with separator column 17 is designed to effect hydraulic shear of the excess growth. This may be carried out by section 29A of the loop which affords a constricted or sinuous flow path through which flow is at a high velocity to create sufficient turbulence to produce a shearing action.

In FIG. 8, there is shown a feature that is usable in conjunction with the third, fourth and fifth embodiments of the invention, the growth control system in this instance including a valve 31 in loop 29. Also included is an auxiliary loop 33 having a valve 32 therein and extending between the head or clear zone 15 above the fluidized bed and the section of main loop 29 between valve 31 and pump 30, the auxiliary loop acting to feed clear effluent into the main loop.

When alarm point AP is reached, the sensor detecting this point in the control system serves not only to open valve 23 in the draw-off port 21 of the separator column, but also functions to open valve 31 in the main loop 29 to initiate a shearing action, valve 32 in the auxiliary loop remaining closed during this operation.

When, however, the level of the fluidized bed is reduced by the shearing action to the level of safety point SP, the sensor detecting this point acts to close valve 31 and to open valve 32 in order to feed clear effluent into separator column 17 while pump 30 is kept open, this action serving to flush out the pump and the line to free them of contaminants. This flushing action is continued for a few minutes or as long as is necessary until the system is cleansed, after which the entire system is automatically de-activated and remains in this state until the build-up of cellular material elevates the level of the fluidized bed to re-activate the growth control system.

In the sixth embodiment shown in FIG. 9, the separator column 17 extended into the clear zone or effluent head 15 above fluidized bed 14 has its low end spaced from the bed rather than immersed therein as in the previous embodiments. In this arrangement, pump 30 in loop 29 serves to deliver fluidized bed particles to separator column 17, shearing of the bio-mass being effected by any of the means previously disclosed.

The flow rate of sludge exiting separator column 17 through valve 23 must, in this instance, not be significantly lower than the rate of flow at which transfer pump 30 brings the material into the separator column; for otherwise, the sheared growth will back up into the process effluent. While this results in the loss of some flexibility in controlling the concentration of the waste sludge, it has the advantage of simplifying the construction of the separator column in those situations where the clear zone 15 above the fluidized bed is relatively high.

The seventh embodiment illustrated in FIG. 10 is essentially the same as that in FIG. 9, save that a recirculation pump 33 is added to an auxiliary loop 36 extending between the upper end of main loop 29 and a point in column 17 adjacent the low end thereof, the recirculation pump serving to augment the shearing action produced by transfer pump 30.

In the eighth embodiment illustrated in FIG. 11, the low end of separator column 17 in the effluent head 15 is again above the level of the fluidized bed 14. In this arrangement, a small vertical pipe 34 is projected down from the low end of column 17 into the fluidized bed itself. Compressed air from a source 37 is fed into pipe 34 through a low end port 35 therein, the rising air causing the media to flow into separator column 17 and at the same time providing the necessary shearing action. This shearing action within the column can be augmented by mixing motor 20 as arranged in the first embodiment.

While there have been shown and described preferred embodiments of an excess-growth control system for fluidized-bed reactor in accordance with the invention, it will be appreciated that many changes and modifications may be made therein without, however, departing from the essential spirit thereof. Thus in the event the reactor is subject to diurnal flow which brings about variations in the depth of the fluidized bed in the course of the day, the arrangement may be made such that the growth control system is maintained in a quiescent condition except for those periods when excess bed expansion occurs. Or the operations initiated by the alarm point and the safety point sensors may be modified to take into account diurnal variations. Alternatively, one can operate the growth control system continuously rather than intermittently, in which case the rate of growth control is made such as to remove excess growth at about the same rate as growth takes place, so that growth control is never interrupted and the level of the fluidized bed is never permitted to undergo more than a slight expansion.

It should also be recognized that the high end of the separator column may be sealed so that the entire separator column may be placed below the surface of the head of liquid effluent.

We claim:

1. A control system for preventing accumulation of excessive cellular material in a fluidized-bed reactor wherein waste water or other liquid to be processed is conducted upwardly therein at a velocity conducive to fluidization through a bed of particles which function as a carrier for the growth of the material, a head of effluent being developed above the bed from which the effluent is discharged from the reactor; the system comprising:

(A) a separator column disposed in the reactor with its low end extending toward the fluidized bed and its high end extending toward the effluent head, said column having a draw-off port somewhat below the surface of the effluent head;

(B) an agitator arrangement associated with the column to effect, when activated, shearing of the excess cellular material from the particles to produce in the column a mixture of sheared material and partially-stripped carrier particles; and (C) means to activate said arrangement when the expansion of the fluidized bed, as a result of said growth, reaches an alarm limit indicative of excessive growth, to provide an exit flow rate at the draw-off port which results in an upward flow velocity in the separator column that is lower than the settling velocity of the partially-stripped carrier particles but higher than the settling velocity of the sheared material whereby the sheared material is washed away through the draw-off port.

2. A control system as set forth in claim 1, wherein said low end of the separator column extends into the fluidized bed itself.

3. A control system as set forth in claim 1, wherein the low end of said separator column is located in the head of effluent above the fluidized bed, further including means to transfer the particles from the fluidized bed to the separator column.

4. A control system as set forth in claim 3, wherein said transfer means functions to effect said shearing action.

5. A control system as set forth in claim 1, wherein said exit flow rate is adjusted by a valve in the draw-off port.

6. A control system as set forth in claim 1, further including means to de-activate said arrangement when the level of said fluidized bed, as a result of the shearing activity, falls to a predetermined safety limit.

7. A control system as set forth in claim 1, wherein said agitator arrangement is constituted by a motor-driven mixing blade operating within the lower portion of the separator column.

8. A control system as set forth in claim 1, wherein said agitator arrangement is constituted by a transducer disposed in said separator column to produce sonic energy.

9. A control system as set forth in claim 1, wherein said agitator arrangement is external to said reactor and is constituted by a loop having a pump therein to draw the particles coated with cellular material from the column and to return the material to the column.

10. A control system as set forth in claim 9, wherein said loop further includes a line static mixer.

11. A control system as set forth in claim 9, wherein said loop further includes means to effect hydraulic shearing.

12. A control system as set forth in claim 1, wherein the low end of the separator has a cone attached thereto.

13. A control system as set forth in claim 10, further including means to inject effluent from said head into said loop when the system is inactive to clear said loop.

14. A system as set forth in claim 3, wherein said transfer means includes a main loop including a transfer pump to draw particles from said fluidized bed and to feed said particles to said separator column at a high point.

15. A system as set forth in claim 14, further including an auxiliary loop including a second pump to draw particles from adjacent the low end of said separator column and to feed these particles back to said column at said high point to augment said shearing action.

16. A system as set forth in claim 3, wherein said transfer means includes a pipe projecting from a point in said column adjacent the low end thereof into the fluidized bed, and means to inject compressed air into said pipe to force particles from said bed through said pipe into said column.

17. A control system for preventing the production of excessive cellular material in a fluidized-bed reactor wherein waste water or other liquid to be processed is conducted upwardly therein at a velocity conducive to fluidization through a bed of particles which function as a carrier for the growth of the material, a head of effluent being developed above the bed from which the effluent is discharged from the reactor; the system comprising;

(A) a separator column disposed in the reactor with its lower end extending toward the fluidized bed and its high end extending toward the effluent head, said column having a draw-off port somewhat below the surface of the effluent heat;

(B) a normally closed valve in said draw-off port;

(C) an agitator arrangement associated with the column to effect, when activated, shearing of the excess cellular material from the particles to produce in the column of mixture of sheared material and partially-stripped carrier particles;

(D) means simultaneously to open said valve and to activate said arrangement when the expansion of the fluidized bed, as a result of said growth, reaches an alarm limit indicative of excessive growth, to provide an exit flow rate at the draw-off port which results in an upward flow velocity in the separator column that is lower than the settling velocity of the partially-stripped carrier particles but higher than the settling velocity of the sheared material whereby the sheared material is washed away through the draw-off port; and (E) means to simultaneously close said valve and to deactivate said arrangement when the level of the bed, as a result of said shearing, reaches a safety limit below said alarm limit, thereby completing an excess-growth removal cycle.

18. A system as set forth in claim 17, further including a first sensor to produce a signal when said alarm limit is reached and a second sensor to produce a signal when said safety limit is reached, and electronic control means responsive to the signals from the first and second sensors to automatically effect said activation and deactivation of said arrangement and the simultaneous opening and closing of said valve.

19. A system as set forth in claim 17, wherein said draw-off port feeds said sheared material to a dewatering unit.

20. In a control system for preventing accumulation of excessive cellular material in a fluidized-bed reactor wherein waste water or other liquid to be processed is conducted upwardly therein at a velocity conducive to fluidization through a bed of particles which function as a carrier for the growth of the material, a head of effluent being developed above the bed from which the effluent is discharged from the reactor;

a separator column disposed in the reactor with its low end extending toward the fluidized bed and its high end extending toward the effluent head, said column having a draw-off port somewhat below the surface of the effluent head; and means associated with said column to effect shearing of the excess cellular material from the particles to produce in the column a mixture of sheared material and partially-stripped carrier particles, which partially stripped particles are returned to said bed while the sheared material is discharged from said column through said draw-off port.

* * * * *